J. G. PETERSON.
Motor.

No. 163,689.

Patented May 25, 1875.

WITNESSES:

INVENTOR:
J. G. Peterson
BY
ATTORNEYS.

UNITED STATES PATENT OFFICE.

JACOB G. PETERSON, OF MORGANTON, NORTH CAROLINA.

IMPROVEMENT IN MOTORS.

Specification forming part of Letters Patent No. 163,689, dated May 25, 1875; application filed March 13, 1875.

*To all whom it may concern:*

Figure 1:
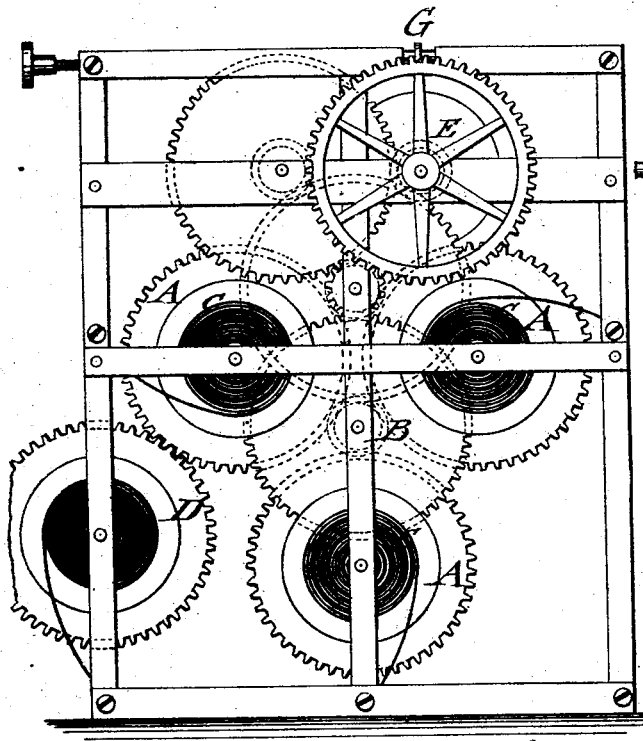
Figure 2:
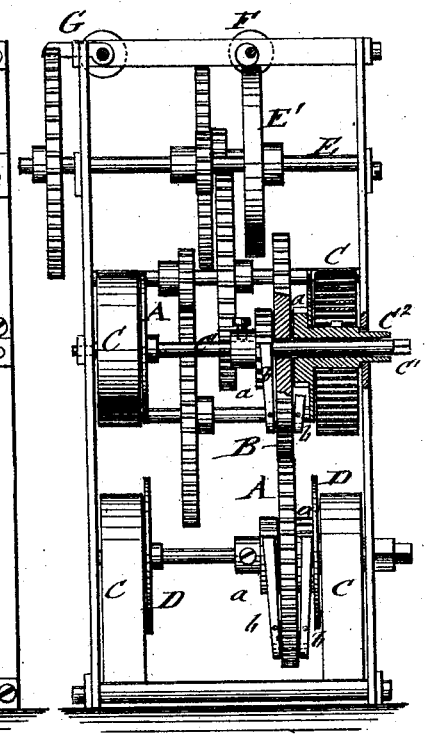
Figure 3:
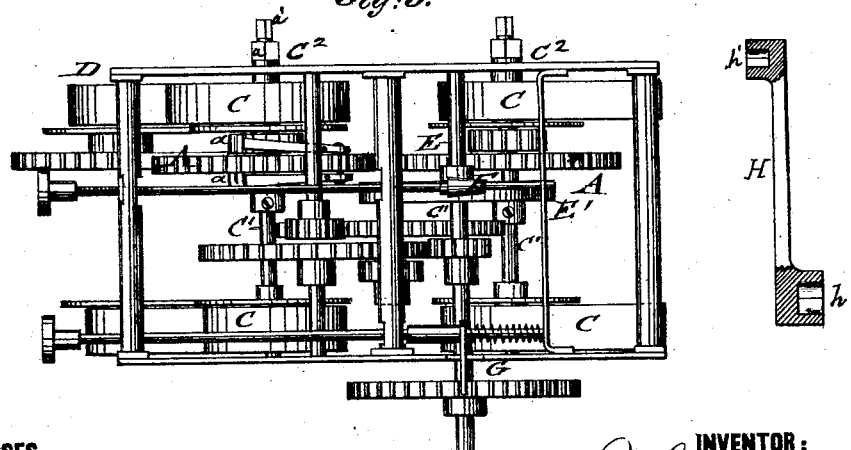

Be it known that I, JACOB G. PETERSON, of Morganton, in the county of Burke and State of North Carolina, have invented a new and Improved Sewing-Machine Motor, of which the following is a specification:

In the accompanying drawing, Figure 1 is a side elevation, Fig. 2 a sectional end elevation, and Fig. 3 a top view, of my improved motor for sewing-machines and other light machinery.

Similar letters of reference indicate corresponding parts.

The invention will first be fully described, and then pointed out in the claim.

In the drawing illustrating my invention, A represents a set of three primary cog-wheels, which are arranged in triangular shape to gear with a central pinion, B. Two powerful band-springs, C, are wound on the shaft $C^1$ of each primary wheel, of which one is applied directly to the solid shaft, while the other is placed on an outer hollow shaft, $C^2$, both springs re-enforcing each other and transferring, by means of ratchet-wheels $a$, keyed to shafts $C^1$ and $C^2$, and spring-pawls $b$, their accumulated power to each wheel A.

It will be observed that each of the shafts $C^1$ is provided with two springs, one directly on the shaft and one on a sleeve, while there are two wrench-squares, $a$ $a'$, which are operated at different times by the wrenches $h$ $h'$ on the ends of a bar, H. Thus a power is applied to one shaft by two springs separately wound when the same could not be used with one spring on account of the difficulty in winding it up.

The three wheels A transmit jointly the power of their respective actuating-springs to the pinion B, which communicates, by suitable intermediate gear-wheels, the compound power thus obtained to the driving-shaft E.

The springs C are wound up separately by keys fitting the square ends of the inner and outer shafts.

For the purpose of increasing the compound power on the central pinion the primary wheels may be connected, by auxiliary or helping wheels, to additional wheel-circuits, so that a considerable amount of power may be produced thereby, and light machinery of various kinds may be run therewith.

The auxiliary wheels have coiled springs in the same manner as the primary wheels, one of such wheels D being shown for illustration in the drawing, which is intended to represent the series of circuits or trains that bring their aggregate auxiliary force equally upon the primary wheels and the transmitting central pinion.

The driving-shaft E carries a brake-wheel, E', to which a friction-cone or eccentric, F, is applied with greater or less force by a regulating screw-rod. This brake device admits the regulation of the speed of the driving-shaft to a nicety, as required by the work, without waste of power.

A spring stopping device or pawl, G, may be carried into a ratchet of the driving-shaft for interrupting instantly the action of the motor and set it going on the release of the same.

Having thus described my invention, I claim as new and desire to secure by Letters Patent—

The combination, with shaft $C^1$, of two separate springs, one coiled directly on it, and the other on a circumjacent sleeve, as and for the purpose specified.

JACOB G. PETERSON.

Witnesses:
J. A. CLAYWELL,
E. S. WALTON.